United States Patent
Stiles

(10) Patent No.: US 6,330,608 B1
(45) Date of Patent: Dec. 11, 2001

(54) METHOD AND SYSTEM OF A COMPUTER SYSTEM FOR ESTABLISHING COMMUNICATIONS BETWEEN A SERVICE PROVIDER AND A CENTRAL SERVICE FACTORY AND REGISTRY IN A COMPUTER SYSTEM

(75) Inventor: Ian James Stiles, Salem, UT (US)

(73) Assignee: Stiles Inventions L.L.C., Salem, UT (US)

(*) Notice: Subject to any disclaimer, the term of this patent is extended or adjusted under 35 U.S.C. 154(b) by 0 days.

(21) Appl. No.: 08/828,721

(22) Filed: Mar. 31, 1997

(51) Int. Cl.$^7$ ..................................................... G06F 13/00
(52) U.S. Cl. ........................................... 709/229; 713/201
(58) Field of Search ...................................... 709/217, 218, 709/225, 229; 395/200.47, 200.48, 200.55, 200.59; 380/4, 30; 713/201

(56) References Cited

U.S. PATENT DOCUMENTS

| | | | |
|---|---|---|---|
| 3,790,957 | 2/1974 | Dukes et al. | 340/825.31 |
| 4,870,683 | 9/1989 | Atalla | 380/56 |
| 4,885,779 | 12/1989 | Atalla et al. | 380/56 |
| 4,888,801 | 12/1989 | Foster et al. | 380/277 |
| 5,081,676 | 1/1992 | Chou et al. | 705/55 |
| 5,153,919 | 10/1992 | Reeds, III et al. | 380/44 |
| 5,200,999 | 4/1993 | Matyas et al. | 380/277 |
| 5,226,079 | 7/1993 | Holloway | 713/177 |
| 5,228,137 | 7/1993 | Kleinerman et al. | 703/26 |
| 5,261,070 | 11/1993 | Ohta | 713/202 |
| 5,265,164 | 11/1993 | Matyas et al. | 380/30 |
| 5,280,426 | 1/1994 | Edmonds | 463/16 |
| 5,287,537 | 2/1994 | Newmark et al. | 712/29 |
| 5,377,191 | 12/1994 | Farrell et al. | 370/401 |
| 5,416,842 | 5/1995 | Aziz | 380/30 |
| 5,418,854 | 5/1995 | Kaufman et al. | 713/156 |
| 5,473,691 | 12/1995 | Menezes et al. | 713/161 |
| 5,490,216 | 2/1996 | Richardson, III | 705/59 |
| 5,495,532 | 2/1996 | Kilian et al. | 380/30 |
| 5,497,421 | 3/1996 | Kaufman et al. | 713/156 |
| 5,533,123 | 7/1996 | Force et al. | 713/189 |
| 5,544,316 | 8/1996 | Carpenter et al. | 709/310 |
| 5,588,060 | 12/1996 | Aziz | 380/30 |
| 5,590,196 | 12/1996 | Moreau | 705/78 |
| 5,790,548 | * 8/1998 | Sistanizadeh et al. | 370/401 |
| 5,850,442 | * 12/1998 | Muftic | 705/65 |
| 5,881,234 | * 3/1999 | Schwob | 709/219 |
| 5,890,086 | * 3/1999 | Wellman et al. | 701/50 |

* cited by examiner

Primary Examiner—Kenneth R. Coulter
(74) Attorney, Agent, or Firm—Lloyd W. Sadler

(57) ABSTRACT

A system and method for registering computer software modules to allow or reject it for opportunities of interacting with a computer system, hardware and software and receiving service requests is described. The method is designed to receive the module; to check whether the module contains any suspect "virus type" code; to check the module's version compatibility; to check if the module contains an agreement string, a trademark string and a copyrighted text string. If all checks are valid, the module is registered and permitted to link and receive service requests. If not the module is rejected.

7 Claims, 2 Drawing Sheets

METHOD AND SYSTEM OF A COMPUTER SYSTEM FOR ESTABLISHING COMMUNICATIONS BETWEEN A SERVICE PROVIDER AND A CENTRAL SERVICE FACTORY AND REGISTRY IN A COMPUTER SYSTEM

BACKGROUND OF THE INVENTION

1. Field of the Invention

This invention relates generally to computer systems, particularly computer systems which access or are accessible by other computer system, and to methods of controlling access to the accessed computer system. Specifically this invention relates to methods for recognizing valid computer service providers who are requesting access to a local or a remote computer system. More specifically this invention relates to methods and the technology for validating access to a local or a remote computer access providers. When used in combination with a remotely accessible digital computer, this invention serves to provide an means for allowing validated service providers to register for receiving service requests, thereby allow access to computer systems, software and utilities that are proprietary. For the purposes of this patent application, computer system is defined as one or more computational devices, employing processing units and methods of communicating data between such processing units. Such a computer system may be a single "stand-alone" computational device or a "network" of more than one computational device connected over electrical lines, optical signals, phone lines or any other method well know in the art as a method of communicating between computer systems.

Providing a method for validating a computer system service provider software module that requires registration with a system of either computer software or computer hardware, provides a useful technique for protecting the proprietary rights of the owner of the accessed computer system, without requiring the inconvenience and expense of digital signatures and/or hardware keys.

2. Description of Related Art

Various approaches are widely used to control access to computer systems, software and databases. Some well known approaches include: digital signatures, hardware keys, and proprietary interfaces. Digital signatures involve using an encryption algorithm, or key, to build a checksum and then attaches that checksum to the software module. Modules that have been tampered with or which have not correctly built the checksum because they do not have the authorized encryption key are rejected and are not allowed to link with the system. Hardware keys use a pair of encryption keys. One of which is contained within the software and the second is provided in a hardware module. The hardware module usually attaches to the computer system parallel port. The system only permits access if both the software keys and the hardware keys combine to produce an expected result. A proprietary interface is typically designed such that for an unauthorized module to attach, it must be carefully and correctly reverse engineered. Generally, such proprietary interfaces are non-trivial to reverse engineer and, furthermore, are protected by contract, making it a breach of contract to reverse engineer or to permit reverse engineering of the proprietary interface.

Other approaches described in the related art include the following: a digital key device which operates in combination with a conventional lock and a digital computer for providing a secondary security device; a personal identification encryption device; a hierarchical key management system for controlling access to secure computer terminals and networks; a hardware device, containing a key, to be plugged into a computer port which in combination a second key contained within software is used to prevent unauthorized use of software; a protocol for authenticating a cellular telephone to a service provider for the purpose of preventing piracy of cellular services, a data processing system for managing a public key cryptographic system involving both a public key and a private key, a crypto graphically linked authentication token for providing a means of identification of messages sent over data networks, a method for simultaneously executing one or more computer application programs in one or more host computer systems including a method of identifying the source computer, a method for determining whether a user is authorized to use a data communication network, a method and system for replicating a cryptographic facility in a public key crypto system, a computerized system including a method for managing the subscription of players into games of chance, a distributed computer system having a number of computers each using a information for identifying other computers for executing received commands, a network communications system, a method for key-management use with Internet protocols at site firewalls, a method for protecting the confidentiality of passwords in a distributed data processing system, a system and method for computer data transmission that may include password data, a system for software registration using unique registration numbers, a method of securing electronic voting, a programmable distributed personal security device, a method of providing communications services between multiple processes, including allowing the processes to register as a part of a distributed context, a method for a key-management scheme for Internet protocols, and a secure payment method.

This invention provides several important advantages over the prior approaches, including but not limited exclusively to: the overhead of digital signing is unnecessary, the separate and costly hardware key is not needed, the interface need not be treated as proprietary and therefore can be tried and tested before requiring the purchase of a license. Furthermore, this invention is designed to meed the unique requirements of computer services, software and/or developers in controlling access specifically to computer systems and computer software modules.

For general background material, the reader is directed to U.S. Pat. Nos. 3,790,957, 4,870,683, 4,885,779, 4,888,801, 5,081,676, 5,153,919, 5,200,999, 5,226,079, 5,228,137, 5,261,070, 5,265,164, 5,280,426, 5,287,537, 5,377,191, 5,416,842, 5,418,854, 5,473,691, 5,490,216, 5,495,532, 5,497,421, 5,533,123, 5,544,316, 5,588,060, and 5,590,196 each of which is hereby incorporated by reference in its entirety for the material disclosed therein.

SUMMARY OF THE INVENTION

It is desirable to provide a method and system for validating service providers, over computer networks, who desire to receive service from a central service factory or computer system which provides a method of protecting the proprietary rights of the central service factory or computer system. Furthermore, it is desirable to have a method of recognizing valid service providers without the costs and inefficiencies of digital signature encoding, special purpose hardware key devices or reliance on a proprietary interface. It is also desirable to have a method and system for validating a service provider for access to a computer system, hardware; software; and databases, which validates by checking for computer viruses or unexpectedly modified code, for version compatibility, trademark, license, copyright strings, thereby limiting validation to developers of software who have previously agreed to be bound by the conditions of the registration process. It is desirable to have a method of controlling the exclusivity of software desiring to interface to a specific computer system framework.

Accordingly, it is a primary object of this invention to provide a method and system for validating service providers prior to allowing such providers access to a computer system, including the computer system's hardware and software.

It is a further objective of this invention to provide a method which, through registration, protects the ownership rights of computer system owners.

It is a further objective of this invention to provide a method for recognizing the valid, registered service providers without incurring the costs and inefficiencies of digital signature encoding, special purpose hardware devices, or proprietary interfaces.

It is a further objective of this invention to provide a method and system for validating a service provider for access to a computer system which checks for computer viruses, version incompatibility, and the omission of agreement strings and denying access if found.

It is a further objective of this invention to provide a method and system for controlling the access of software desiring to have access to a specific computer system framework.

These and other objects of this invention, which will be clear to those of ordinary skill in the art upon review of this patent specification and claims, are achieved by an invention which permits access of a module or service provider to a computer system by checking for registration; the existence of computer viruses; for the version of the module, for the agreement, copyright language string, and trademark, and allowing links to the computer system, thereby providing access to service requests, only if the module or service provider passed these checks.

DETAILED DESCRIPTION OF THE INVENTION

This invention provides a method and system for registering modules or service providers requesting access to a computer system, its hardware and/or its software. Computer system is defined by the applicant to include one or more computational devices capable of executing prearranged instructions wherein said computational devices include one or more processing units. The method of the invention acts in association with existing applications on the computer and is "called" from other computer applications. When the invention is properly used only registered modules will have access to the computer system, thereby improving security and protecting the computer system owner's proprietary rights in the computer system, its hardware and its software.

Figure 1:
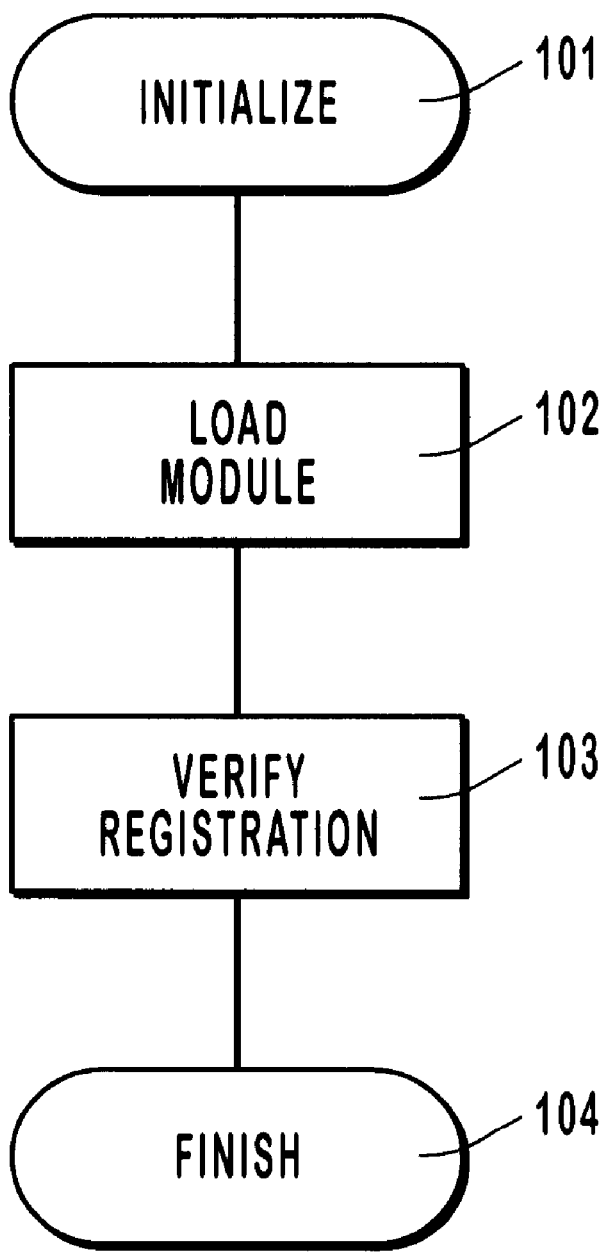
FIG. 1 depicts top level flow chart of the process of this invention.

FIG. 1 shows the preferred embodiment of the method or process of the invention. The invention, in its best mode of operation, is coded in the Java computer language and is performed using the TreeFactory module, the MailFactory module and the CredentialFactory module. In its preferred embodiment the invention is practiced by an first being initialized 101, which step includes loading the invention into computer memory so that automatic interaction with requesting applications can occur. Next, a module or application is loaded into computer memory for registration 102. The module loads the Registration routine 103, which is located in the WebTreeFactory static module, to verify the validity of the module. Following the registration step of the invention, the module is either accepted and registered, after which access to the computer system is granted or the module is rejected and access denied, the invention is finished processing 104.

Figure 2:
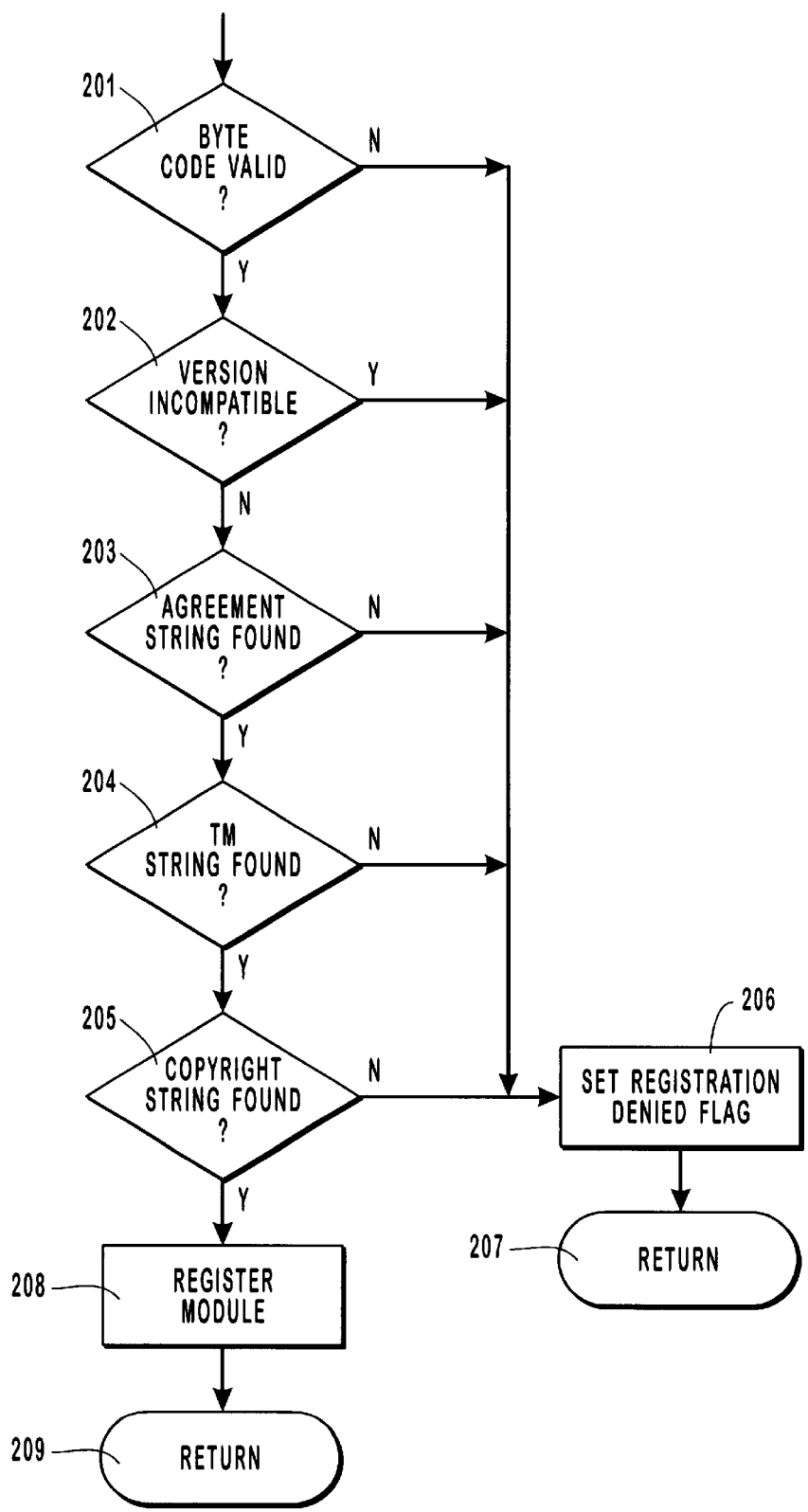
FIG. 2 depicts a detail flow chart of the "Registry" step of the process of the invention.

FIG. 2 shows the preferred embodiment the Registration routine of the invention. First, a byte check is made 201 to verify that the module is free of virus type code. This step is typically performed, in the best mode of the invention, by the Java class loader. Next, if the module passes the byte check of step 201, a test is made to determine if the version of the module is compatible with the system 202. If the module passes the version test of step 202, then a test is made as to whether the module contains expected string value 203, where the string searched for indicates the conscious awareness of the license agreement relating to access to the system. Next, if the module contains the required string of step 203, a test is made to determine if the module contains the required trademark string 204. If the required trademark string is detected than the process of the invention, tests for the existence of the required copyright string 205. If each test is passed by the requesting module, specifically, if the module has passes the byte code test, has a compatible version, contains the agreement string, the trademark and the copyrighted material, then the module is registered 208, the Registration routine returns 209 and the process of the invention is finished. Once the module is registered, the module is allowed to service requests in the system. In the event that the module fails any of the above tests, the module is denied 206 access to the system and Registration routine returns 207 to the top level of the invention. The code performing-the Registration process is located in the TreeFactory.registerTreeFactoryClass ( ) of the best mode of the invention.

It should be noted that the method and system of this invention may, and in the best mode of operation is, implemented in one or more digital computer systems. Typically such computer systems will have a central processing unit, dynamic memory, static memory, mass storage, a command input mechanism (such as a keyboard, mouse, trackball or other equivalent input device), a display mechanism (such as a monitor, flat screen display or other equivalent output device), a hardcopy device (such as a printer, plotter or other equivalent hardcopy device). Variations of such a computer system can be used as well. Such variations may include: laptop computers, personal computers, minicomputers, mainframe computers, special purpose servers and digital controllers. The computer system will typically run under the software control of an operating system and a program capable of performing the method of the invention. The method of the invention will, in its current best mode, be implemented in the Java programming language. However, it could conceivably be performed in other programming languages, including but not limited to FORTRAN, PASCAL, C, and C++, or any other suitable programming language. The computer system may be part of a local area network, and/or a wide area network, may operate essentially as a standalone computer or primarily as an access port to the Internet.

It is to be understood that the above described embodiments of the invention are merely illustrative of numerous and varied other embodiments which may constitute applications of the principles of the invention. Such other embodiments may be readily devised by those skilled int he art without departing from the spirit or scope of this invention and it is the inventor's intent that such other embodiments of the invention be deemed to be within the scope of this invention.

I claim:

1. A process for registering modules for access to a computer system comprising:
    (A) receiving a module for registration;
    (B) loading said module into computer memory;
    (C) checking said module for compliance with requirements for access to the computer system, wherein said checking includes testing said module to determine if said module includes a required trademarked string;
    (D) if said module is found to comply with said requirements for access, granting access to said module, otherwise denying access.

2. A process for registering modules for access to a computer system, as recited in claim 1 wherein said checking said module for compliance step further comprises the step of checking said module for byte code validity.

3. A process for registering modules for access to a computer system, as recited in claim 1 wherein said checking said module for compliance step further comprises the step of checking said module to determine if said module has a version compatible with said computer system.

4. A process for registering modules for access to a computer system, as recited in claim 1 wherein said checking said module for compliance step further comprises the step of checking said module to determine if said module contains an expected string value.

5. A process for registering modules for access to a computer system, as recited in claim 1 wherein said checking said module for compliance step further comprises the step of checking said module to determine if said module contains an expected text string.

6. A process for registering modules for access to a computer system, as recited in claim 1 wherein said checking said module for compliance step further comprises the step of registering said module if all said checks return appropriate values.

7. A process for registering modules for access to a computer system, as recited in claim 1 wherein said checking said module for compliance step further comprises the step of returning to a previous routine.

* * * * *